United States Patent [19]

Borkovitz

[11] Patent Number: 4,993,161
[45] Date of Patent: Feb. 19, 1991

[54] LASER BEAM LEVEL INSTRUMENT

[75] Inventor: Henry S. Borkovitz, Menomonee Falls, Wis.

[73] Assignee: David White, Inc., Germantown, Wis.

[21] Appl. No.: 461,067

[22] Filed: Jan. 4, 1990

[51] Int. Cl.$^5$ .............................................. G01B 11/26
[52] U.S. Cl. ..................................... 33/291; 356/250; 33/DIG. 21
[58] Field of Search ................. 33/290, 291, 227, 228, 33/DIG. 21; 356/147, 148, 149, 250, 247

[56] References Cited

U.S. PATENT DOCUMENTS

| | | | |
|---|---|---|---|
| 3,771,876 | 11/1973 | Ljungdahl | 33/291 X |
| 4,183,667 | 1/1980 | Denton | 356/149 X |
| 4,221,483 | 9/1980 | Rando | 356/250 |
| 4,781,457 | 11/1988 | Hirano et al. | 356/149 X |

*Primary Examiner*—Harry N. Haroian
*Attorney, Agent, or Firm*—Bayard H. Michael

[57] ABSTRACT

The laser beam level instrument includes a laser diode mounted on a pendulous platform suspended from a frame by gold plated Mylar strips which also serve as conductors for supplying power to the diode. The strips are mounted with a 180 degree twist to overcome resistance to flexing/bending so that the platform moves freely under the influence of gravity to provide automatic self-leveling. The diode operates on low d.c. voltage but if d.c. is applied to the strips the magnetic field around the Mylar strips will have sufficient force relative to the geomagnetic field to interfere with free pendulation. So 4.5 volts d.c. is stepped up and inverted to about 20 volts a.c. to avoid interference with the geomagnetic field and to reduce power loss across the gold plated strips. The a.c. voltage is then stepped down and converted back to d.c. voltage (2–3 volts) on the platform to power the diode. A vertical laser beam emitted from the diode is adjusted by an optical flat and collimated by an adjustable focal length lens which is adjusted to account for the manufacturing variances in the length of the strips. The vertical beam is then deflected 90 degrees by a prism, and rotated through a horizontal plane to provide a precise leveling reference.

8 Claims, 1 Drawing Sheet

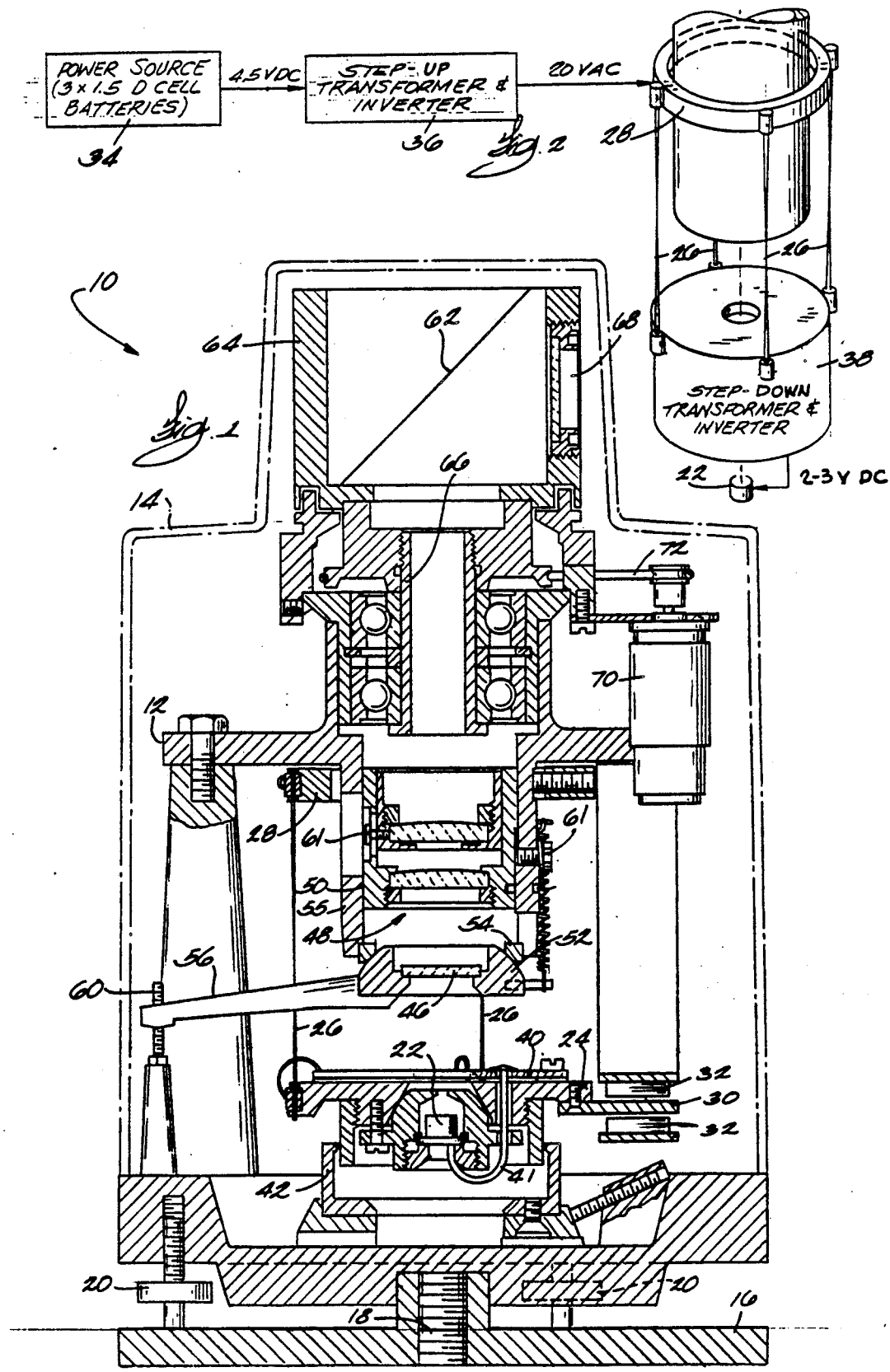

LASER BEAM LEVEL INSTRUMENT

FIELD OF THE INVENTION

This invention relates to self-leveling laser beam level instruments.

BACKGROUND OF THE INVENTION

In general, laser beam level instruments are used in the surveying and construction industries. They typically sweep (rotate) a laser beam in a horizontal plane. The laser beam is then detected by sensors or detectors to determine points level with the base point. The instruments are portable and self-contained.

The laser level is provided with a limited degree of self-leveling to maintain the laser beam in the horizontal plane. Automatic self-leveling makes initial set-up and adjustment of the laser level instrument faster since precise adjustments are not required for the initial set-up of the instrument.

Conventional laser leveling instruments accomplish self-leveling by aiming a stationary laser light source, such as a laser emitting diode, at a pendulated lens mounted below the light source. The pendulated lens moves under the force of gravity within the self-leveling range to position the lens so as to direct the light beam in a true vertical direction. The vertical beam is then deflected 90 degrees into a true horizontal beam by means of a prism or mirrors. Rotation of the prism or mirrors causes the beam to sweep a true horizontal plane, providing a precise leveling reference.

The present invention mounts the laser light source on a pendulous platform instead of on the stationary frame of the instrument.

SUMMARY OF THE INVENTION

The present laser beam level instrument is different from instruments of the past in that it provides a laser light source which is mounted on a pendulous platform. Movement of the platform under the force of gravity is effective to provide self-leveling of the instrument within a limited range so that a laser beam from the laser light source is emitted in a true vertical direction. A stop cup encircles the bottom portion of the platform so that movement of the platform is restricted, thereby limiting the self-leveling range of the instrument. If the limit is reached the laser is turned off and an indicator light signals that the instrument is inoperative.

Mounting the laser light source on a pendulous platform poses problems with respect to the transmission of power to the laser light source, since the self-leveling movement of the platform must not be impaired. Conventional wires would impair movement of the platform. Therefore, transmission of electric power to the laser light source must be done without wires.

An object of the invention is to provide a laser beam level instrument having a laser light source mounted on a Pendulous platform which moves under the influence of gravity to provide automatic self-leveling of the instrument so that the laser light source on the platform emits a true vertical laser beam. The vertical laser beam is subsequently redirected substantially 90 degrees using conventional means to provide a true horizontal laser beam which is swept in a horizontal plane.

Another object of this invention is to provide means for transmitting power to the laser light source without interfering with the swinging movement of the pendulous platform on which the light source is mounted.

Means are provided for suspending the platform from a frame and includes a plurality of thin, flexible strips of gold plated Mylar which also serve as the wiring for supplying power to a laser diode on the pendulated platform. The strips are mounted with twist in each strip to overcome resistance the strip may have to bending in any direction.

The laser diode operates on low d.c. voltage. Conventional wiring cannot be used to get power to the diode since the wires are so stiff as to interfere with free pendulation. Therefore, the gold plated Mylar strips are used as wires. But if d.c. voltage is applied to the strips the magnetic field around the Mylar strips has sufficient force relative to the geomagnetic field to interfere with free pendulation. To overcome this problem, the d.c. voltage from the batteries which power the instrument is converted and stepped up to a.c. voltage for transmission through the Mylar strips. The strips have about 2000 Angstroms of gold plating on both sides of the 0.001 inch thick Mylar. Each strip has about 15 ohms resistance. The higher voltage a.c. avoids significant power loss through the strips. The a.c. voltage is stepped down and converted back to d.c. at the pendulum/laser. The use of the flexible, gold plated Mylar as the suspension and wiring is unique. The step up and inversion of low voltage d.c. to higher voltage a.c. for transmission through the suspension and then the step down and conversion back to low voltage d.c. is unique.

The instrument includes a frame and means for suspending a platform from the frame, which means allows the platform to swing freely within a limited range, as previously described. A conventional rotatable prism redirects the true vertical laser beam emitted by the diode substantially 90 degrees to provide a true horizontal laser beam. An adjustable focal length lens is positioned above the diode for focusing the laser beam and adjusting for variation in the length of the Mylar strips A tiltable optical flat is positioned between the lens and the diode for adjusting the beam of light entering the lens.

Oscillation of the pendulous platform is restrained by a magnetic damping system.

Control means are provided for shutting off the power to the diode when the platform contacts the stop cup. The control means then periodically tries the circuit and if the instrument is restored to its self-leveling range, operation resumes.

BRIEF DESCRIPTION OF THE DRAWINGS

FIG. 1 is a side elevation, partially in section, of the laser beam level instrument.

FIG. 2 is a block diagram illustrating power transmission means for the instrument.

DETAILED DESCRIPTION OF THE DRAWINGS

The instrument 10 includes frame 12, cover 14, and base plate 16 which has threaded socket 18 for mounting on a tripod (not shown). The base plate 16 is provided with screws 20 which are manually adjusted to level the instrument 10 into the automatic self-leveling range as indicated by a bubble level (not shown).

The instrument 10 has a laser light source 22, a laser diode, mounted on a pendulous platform 24. Means suspend platform 24 from frame 12 while allowing the platform to move freely under the influence of gravity.

The suspension means includes a plurality of thin, flexible, gold plated Mylar strips 26. Mylar plastic has great dimensional stability and strength and, when gold plated, can serve as a conductor. The strips are approximately 0.001 inch and the gold plating is 2000 Angstroms thick on each side. The Mylar strips extend between support ring 28 and platform 24 and are twisted 180 degrees to eliminate the resistance the strips would otherwise have to flexing/bending if not twisted. Thus, twisting the strips ensures the platform 24 can swing freely.

Magnetic damping means restrain undesirable oscillation of platform 24. Four metal tabs 30 (one of which is shown) project outwardly from platform 24 between damping magnets 32 which are located above and below the tab and which reduce oscillation of the platform.

The transmission of electric power to laser diode 22 poses special problems. As shown in FIG. 2, a low voltage d.c. power source 34, three D cell batteries, powers the instrument. Means are provided for transmitting power to laser diode 22 without interfering with the self-leveling feature of the instrument. The laser diode operates on low d.c. voltage. Conventional wiring is too stiff to be used to get the power to the diode—the wires would impair pendulation. The gold plated strips are used as conductors. The gold is so thin that the resistance of each strip is about 15 ohms. If d.c. is applied across each strip the magnetic field around the strips will be affected by the geomagnetic field of the earth and Platform 24 will not pendulate properly. So a.c. voltage is used. The d.c. power source 34 supplies 4.5 volts d.c. to an inverter and step-up transformer 36 which converts the d.c. voltage into 20 volts a.c. The inverter is pulse width modulated at about 60 kHz. The a.c. power is then transmitted to platform 24 through gold plated strips 26. The use of a.c. power avoids the effects of the earth's geomagnetic field. In addition, the use of higher voltage a.c. power reduces power loss across each gold plated strip to acceptable levels. A rectifier and step-down transformer 38, mounted on circuit board 40 which is mounted on platform 24, converts and steps-down the higher a.c. voltage into d.c. voltage of approximately 2 to 3 volts. The 2 to 3 volt d.c. power is just sufficient to Power diode 22 and is transmitted from circuit board 40 to diode 22 through a three wire cable 41; two wires power the diode and the third provides feedback to a regulating circuit in the circuit board. The voltage is regulated to be just enough, thus conserving battery power.

The self-leveling range of the instrument is limited by stop cup 42 which encircles platform 24. The laser diode is deenergized in the event platform 24 contacts stop cup 42. For example, the circuit between the power source 34 and the laser diode 22 can open to shut off power to the laser diode in response to platform 24 engaging the cup 42. The control means includes circuitry for periodically testing after shutdown to determine whether platform 24 has returned to its self-leveling range. Operation of the instrument can continue if the instrument is again in its self-leveling range (out of contact with the stop cup).

The laser beam emitted by the laser diode passes through optical flat 46 which is tiltable to adjust the laser beam passing from diode 22 to lens 48. The optical flat is mounted in carrier ring 52 which has a spherical upper surface and which is biased against the seat 54 mounted in barrel 55 depending from frame 12. A pair of legs 56 at 90 degrees to each other (one of which is shown) can be adjusted by screws 60 to tilt the optical flat 46 to any desired angle to aim the laser beam straight up.

The laser beam passes through variable focal length lens 48 mounted in a slidable cylinder assembly 50 within barrel 55. The focal length of lens 48 is adjusted to account for manufacturing variations in the length of the Mylar strips and to focus the lens on diode 22 to substantially collimate the laser beam. Set screws 61 secure lens 48 in its adjusted position.

The means for sweeping the laser beam in a horizontal plane includes rotatable prism 62 which redirects the vertical laser beam into a horizontal position. Prism 62 is mounted in housing 64 so that the prism is directly above lens 48. The laser beam exiting the lens 48 passes through hollow shaft 66 to prism 62 which redirects the vertical beam substantially 90 degrees. Before leaving housing 64 the laser beam passes through optical wedge 68 which adjusts the path of the laser beam for prism variations Housing 64 is rotated by motor 70 and drive belt 72. The motor 70 is powered by the power source 34 and pulse width modulation of the inverter adjusts the speed of rotation of the motor to about 300 rpm.

To summarize; the instrument is first approximately leveled by manually adjusting screws 20 in conjunction with the bubble level. The 4.5 volt d.c. power is converted into 20 volts a.c. by the inverter and step-up transformer 36. The a.c. power is transmitted with minimal power loss through gold plated Mylar strips 26 to rectifier and step-down transformer 38 which converts the a.c. power back into lower voltage d.c. Power (2–3 volts) to power laser diode 22. The diode is mounted on pendulous platform 24 to allow self-leveling of instrument 10. The laser emits a beam through optical flat 46 tiltably adjusted to aim the beam in a true vertical direction through adjustable focal length lens 48. The lens focuses and collimates the beam. The vertical laser beam from lens 48 is deflected 90 degrees by prism 62 which rotates the deflected beam through a true horizontal plane.

I claim:

1. A laser beam level instrument comprising:
   a frame
   a platform,
   means for suspending said platform from said frame so that said platform moves freely under the force of gravity,
   a laser light source mounted on said platform and emitting a vertical beam,
   means for transmitting power to the laser light source without interfering with the movement of said platform, and
   rotatable prism means mounted on said frame for redirecting the vertical beam to a substantially horizontal direction;
   wherein said means for suspending includes a plurality of thin, flexible strips and
   wherein said flexible strips are made of Mylar or equivalent and wherein said strips are twisted;
   wherein said instrument is powered by a d.c. voltage source and wherein the means for transmitting power to said laser light source includes,
      an electrically conductive material applied to said flexible strips,
      means connected between the d.c. voltage source and said flexible strips for converting d.c. to a.c. voltage, and means on said platform and connected between said flexible strips and said laser light source for converting a.c. to d.c. voltage.

2. An instrument as set forth in claim 1, wherein said means for converting d.c. to a.c. includes an inverter and a step-up transformer, and wherein said means for converting a.c. to d.c. includes a rectifier and a step-down transformer.

3. An instrument as set forth in claim 1, wherein said strips are hold plated.

4. An instrument as set forth in claim 3, wherein said platform includes a bottom portion, and wherein said frame includes a stop cup encircling said bottom portion of said platform so that swinging movement of said platform is limited.

5. An instrument as set forth in claim 6, and including control means for shutting off power to said laser light source when said bottom portion of said platform contacts said stop cup, and means for thereafter turning on the power to said laser light source in response to said stop cup losing contact with said platform.

6. An instrument according to claim 3 and further comprising collimating means adjustably attached to said frame above said laser light source and below said prism means.

7. An instrument as set forth in claim 6, wherein said collimating means includes an adjustable focal length lens adjustably positioned at the focal length of said lens from said light source.

8. An instrument as set forth in claim 7 and further concluding an optical flat positioned between said laser light source and said lens, and means attached to said frame for adjusting the tilt of said optical flat.

* * * * *

UNITED STATES PATENT AND TRADEMARK OFFICE
CERTIFICATE OF CORRECTION

PATENT NO. : 4,993,161

DATED : February 19, 1991

INVENTOR(S) : Henry S. Borkovitz

It is certified that error appears in the above-identified patent and that said Letters Patent is hereby corrected as shown below:

In Claim 5, column 5, line 16, the words "claim 6" should read -- claim 4 --.

Signed and Sealed this

Fourth Day of June, 1991

Attest:

HARRY F. MANBECK, JR.

Attesting Officer

Commissioner of Patents and Trademarks